Jan. 25, 1966
H. J. KOZICKI ETAL
3,231,291
LEAF SPRING MOUNTING
Original Filed June 30, 1961
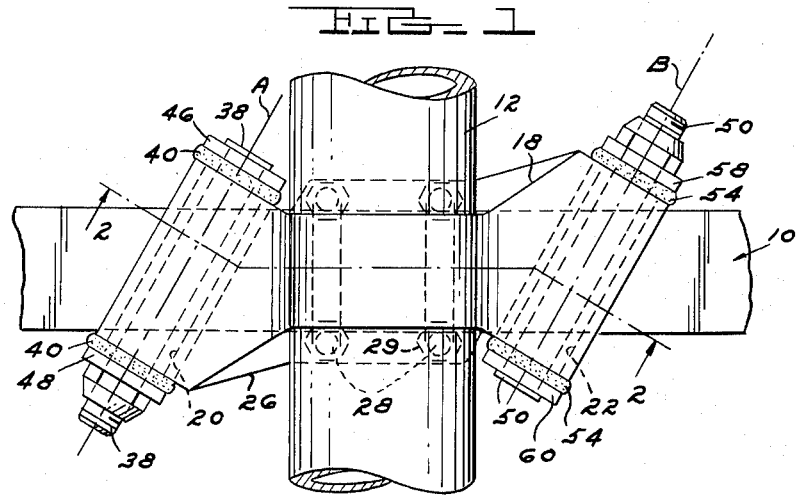
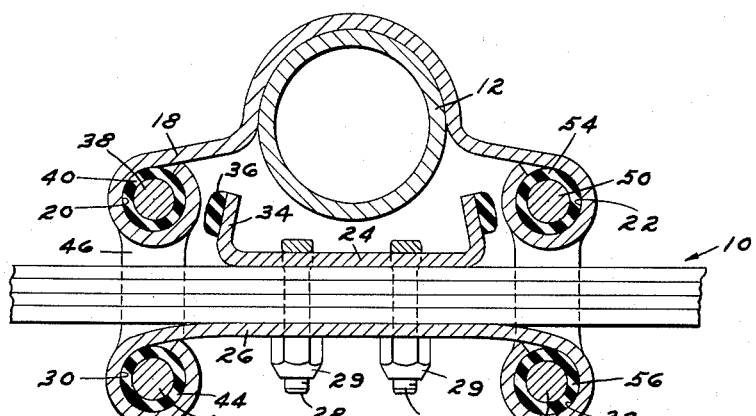
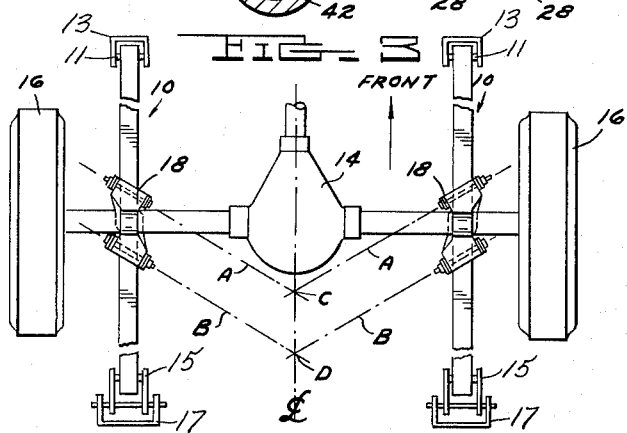
SIDNEY L. FREERS
HENRY J. KOZICKI
INVENTOR.
BY John R. Faulkner
Clifford L. Sadley
ATTORNEYS United States Patent Office 3,231,291
Patented Jan. 25, 1966

3,231,291
LEAF SPRING MOUNTING
Henry J. Kozicki, Orchard Lake, and Sidney L. Freers, Dearborn, Mich., assignors to Ford Motor Company, Dearborn, Mich., a corporation of Delaware
Continuation of application Ser. No. 120,993, June 30, 1961. This application May 8, 1964, Ser. No. 366,108
10 Claims. (Cl. 280—124)

The present invention relates to vehicle suspension systems, and more particularly to a device for securing an axle housing to a leaf type suspension spring.

This patent is a continuation of our application Serial Number 120,993 filed June 30, 1961 (now abandoned).

In a motor vehicle having longitudinally extending leaf members acting as suspension springs, it has heretofore been common practice to secure a central portion of the springs rigidly to the axle housing. This arrangement has the disadvantage that shocks and vibrations are transmitted directly through the axle to the springs when the vehicle's wheels strike minor obstacles. As the springs are attached more or less rigidly to the vehicle body, these objectionable shocks and vibrations are also transmitted to the passenger compartment, with an end result known as ride harshness.

These objections are avoided by permitting limited relative movement between the axle housing and the leaf springs. In accordance with the present invention, four tension shackles are employed to connect the leaf spring and the axle housing so that when one of the wheels carried by the axle strikes an object in the road a small amount of longitudinal movement will be permitted between the axle and the spring. Such action absorbs some of the road shocks as the wheel recedes on impact. This is sometimes referred to as wheel compliance. The shackles being in tension provide a load restriction to movement of the axle except when the wheels encounter a bump and then fore and aft movement of the shackles absorbs the forces and the result is a reduction of harshness and transmission of axle noises.

The present invention provides an angular displacement of the pivot bushings in a shackle type connection between the axle housing and the leaf springs. Specifically, an angle is introduced in the plan view such that the center lines of the bushings extend rearwardly and inwardly in order to obtain what can be called servo steer effect or side thrust steer effect.

The objective is to obtain slight canting of the axle when side forces are encountered between the tire and road. In the preferred embodiment, when the vehicle encounters side forces such as those occurring from wind thrust or cornering, the axle tends to move sideways. Since the axle is attached to the leaf springs by shackles inclined as described above, the effect is to force the outer wheel to move forwardly and the inner wheel rearwardly. This is side thrust steer in the direction of understeer. It is side thrust steer of the type described as instantaneous for it occurs simultaneously with the build-up of forces and is not subject to time delay as with systems dependent upon car roll.

Therefore, it is an object of the present invention to provide a rear suspension having tension type shackles connecting longitudinally extending leaf springs to the axle housing which have their pivot axis inclined to intersect the center line of the vehicle rearwardly of the axle.

Further objects and advantages of this invention will be more fully comprehended from the following description and the accompanying drawings, in which:

FIGURE 1 is a top plan view of an embodiment of the leaf spring to axle housing connection of this invention;

FIGURE 2 is a sectional view taken along section lines 2—2 of FIGURE 1; and

FIGURE 3 is a top plan view of a suspension system incorporating the connection structure of FIGURE 1.

Referring now to the drawings where the presently preferred embodiment of this invention is shown, a plurality of longitudinally extending leaf elements forming a spring 10 are disclosed. The spring 10 is provided in pairs as seen in FIGURE 3, and each is connected to an axle housing 12 of a vehicle's rear suspension. A differential 14 is located midpoint in the axle housing 12 and road wheels 16 are situated at the outer ends. The springs 10 are mounted outwardly on the axle housing 12 near the wheels 16.

The leaf springs 10 are connected to the vehicle chassis in a conventional fashion. Their forward ends are secured by rubber bushings 11 to a pair of frame mounted brackets 13. A shackle type connection 15 joins the rear end of each of the springs 10 to rear frame brackets 17. These end connections permit the leaf springs 10 to flex relative to the chassis during jounce and rebound movement of the axle 12.

Referring to FIGURE 2, it is seen that the housing 12 has a generally tubular configuration. A serpentine bracket 18 is welded to the axle tube 12 and has a pair of eyes 20, 22 situated fore and aft thereof.

The leaf spring 10 has upper and lower clamps 24 and 26 secured by means of U-bolts 28. The upper spring clamp 24 and the lower spring clamp 26 trap the leaf spring 10 and provide a mounting means for connection with the bracket 18 of the axle housing. The upper spring clamp 24 has a pair of openings through which the legs of the U-bolts 28 extend to engage the lower clamp 26. The entire structure of upper clamp 24, spring leaves which make up the spring 10 and lower clamp 26 is sandwiched together by the tightening of nuts 29 on the U-bolts 28.

The upper spring clamp 24 has upstanding end portions 34 that carry rubber bumpers 36. The bumpers 36 provide a cushioned limit to relative movement between the spring clamp 24 and upper bracket eyes 20 and 22.

The lower spring clamp 26 has forwardly and rearwardly positioned bushing eyes 30 and 32. The clamp 26 is formed of sheet metal and has its end portions turned in a circular fashion to provide the eyes 30, 32.

The pivot eyes 20, 22, 30 and 32 form the mounting means for the pivot bushings of the tension shackles. The eye 20 contains a bolt-like pivot shaft 38 that is rotatably supported by an elastic bushing 40 of circular configuration. Similarly, the eye 30 of the lower clamp 26 contains a bolt-like pivot shaft 42 which is positioned within the eye 30 by a cylindrical elastic bushing 44. Pivotally secured to and linked between the pivot shafts 38 and 42 are inner and outer shackles 46 and 48. It will be noted from the drawing of FIGURE 1 that portions of the elastic bushing 40 protrude from the end of the eye 20 and provide a cushioning layer between the shackles 46 and 48 and the bracket 18.

The bushings of the eyes 22, 32 situated rearwardly of the axle housing 12 are generally similar. Upper eye 22 contains a pivot bolt 50 and lower eye 32 contains a pivot bolt 52. The bolt-like pivot shafts 50 and 52 are positioned within the eyes 22 and 32 by cylindrical elastic rubber elements 54 and 56. Inner and outer shackles link the pivot bolts 50 and 52. These shackles are identified by the reference numerals 58 and 60. Again, it will be noted that the ends of the rubber elements 54 and 56 protrude into the space between the shackles 58 and 60 and the end face of the eyes 22 and 32.

As seen in FIGURES 1 and 3, the eyes 20 and 30 have center lines or axes A which are canted to the center line of the axle housing 12 and intersect the center line of the vehicle rearwardly of the axle housing 12 at the point C. The axes B of the rear eyes 22 and 32 are parallel to axes A and intersect the center line of the vehicle at a point D behind point C. The interconnecting tension shackles 46, 48, 58 and 60 pivot about the axes A and B.

Thus, a structure is provided which includes an axle housing bracket and a leaf spring bracket that are joined by four tension shackles, the shackles being pivotally connected to their respective members and having pivot axes inclined to the axis of the housing 12 so as to intersect the center line of the vehicle rearwardly of the differential.

Slight fore and aft movement of the springs 10 is permitted by the shackles. In addition, due to the inclination of the shackles' pivot axes A and B, an automatic steering effect is introduced that is responsive to side thrust or lateral forces. By way of an example, assume that a vehicle having the suspension of FIGURE 3 is executing a turn to the right. Under such circumstances, centrifugal force acting on the vehicle body will urge it and the leaf springs 10 to the left with respect to the ground, the wheels 16 and the axle 12. Under the influence of the centrifugal force pushing the springs 10 to the left, the shackles will pivot to permit the lateral displacement. Because the shackles may swing solely in a plane perpendicular to the axes A and B and further because these axes are inclined as shown in FIGURE 3, articulation of the shackles will move the springs longtiudinally as well as laterally with respect to the axle housing 12.

The centrifugal force of a right-hand turn will cause the right-hand end of the axle 12 to move rearwardly with respect to the right spring 10 as the shackles swing about their axes and the left-hand end of the axle 12 to move forwardly with respect to the left spring 10. This canting of the axle will tend to steer the vehicle to the left or out of the right-hand turn that produced the centrifugal force. This effect is known as understeer. To understand the operation of the suspension, it is important to realize that the relative movement does not occur along the axes A and B but rather it occurs perpendicular to such axes because the shackles pivot in planes that are perpendicular to those axes.

The foregoing description constitutes the preferred embodiment of the present invention, however, those skilled in the art may conceive modifications and alterations which will come within the scope and spirit of the appended claims.

We claim:

1. A vehicle suspension having an axle housing, a leaf spring and a device for connecting an axle housing to a leaf spring comprising a pair of fore and aft elastic bushings secured to said housing, fore and aft spaced apart elastic bushings secured to said spring, sets of fore and aft tension shackles interconnecting said fore and aft bushings, said bushings having their axes intersecting the center line of said vehicle to one side of said housing.

2. A vehicle suspension having an axle housing, a leaf spring and a device for connecting an axle housing to a leaf spring comprising a pair of fore and aft elastic bushings secured to said housing, fore and aft spaced apart elastic bushings secured beneath and to said spring, sets of fore and aft tension shackles interconnecting said fore and aft bushings, said bushings having their axes intersecting the center line of said vehicle rearwardly of said housing.

3. A vehicle wheel suspension system for a vehicle chassis comprising a transversely extending rigid axle housing, a road wheel rotatably mounted at each of the ends of said axle housing, a pair of elongated generally longitudinally extending wheel positioning means connected to said vehicle chassis, separate connecting means connecting each of said wheel positioning means to said axle housing, said connecting means each comprising a plurality of shackles, each of said shackles being pivotally connected at one of its ends to said axle housing and at its other end to said wheel positioning means, the pivot axes of said shackles being slightly inclined in the plan view to the axis of rotation of said road wheels whereby said axle housing will cant relative to said vehicle chassis to produce a steering effect when a lateral force is imposed upon said vehicle chassis.

4. A vehicle wheel suspension system for a vehicle chassis comprising a transversely extending rigid axle housing, a road wheel rotatably mounted at each of the ends of said axle housing, a pair of elongated generally longitudianlly extending wheel positioning means connected to said vehicle chassis, separate connecting means connecting each of said wheel positioning means to said axle housing, said connecting means each comprising a plurality of tension shackles, each of said tension shackles being pivotally connected at one of its ends to said axle housing and at its other end to said wheel positioning means, the pivot axes of said tension shackles being slightly inclined in the plan view to the axis of rotation of said road wheels whereby said axle housing will cant relative to said vehicle chassis to produce a steering effect when a lateral force is imposed upon said vehicle chassis.

5. A vehicle wheel suspension system for a vehicle chassis comprising a transversely extending rigid axle housing, a road wheel rotatably mounted at each of the ends of said axle housing, a pair of generally longitudinally extending leaf springs connected to said vehicle chassis, separate connecting means connecting each of said leaf springs to said axle housing, said connecting means each comprising a plurality of shackles, each of said shackles being pivotally connected at one of its ends to said axle housing and at its other end to said leaf spring, the pivot axes of said shackles being slightly inclined in the plan view to the axis of rotation of said road wheels whereby said axle housing will cant relative to said vehicle chassis to produce a steering effect when a lateral force is imposed upon said vehicle chassis.

6. The combination of claim 5 including resilient stop means connected to each of said springs and constructed to limit relative movement between each of said springs and said axle housing.

7. A vehicle wheel suspension system for a vehicle chassis comprising a transversely extending rigid axle housing, a road wheel rotatably mounted at each of the ends of said axle housing, a pair of generally longitudinally extending leaf springs connected to said vehicle chassis, separate connecting means connecting each of said leaf springs to said axle housing, said connecting means each comprising a plurality of tension shackles, each of said tension shackles being pivotally connected at one of its ends to said axle housing and at its other end to said leaf spring, the pivot axes of said tension shackles being slightly inclined in the plan view to the axis of rotation of said road wheels whereby said axle housing will cant relative to said vehicle chassis to produce a steering effect when a lateral force is imposed upon said vehicle chassis.

8. The combination of claim 7 including resilient stop means connected to each of said springs and constructed to limit relative movement between each of said springs and said axle housing.

9. A vehicle wheel suspension system for a vehicle chassis comprising a transversely extending rigid axle housing, a road wheel rotatably mounted at each of the ends of said axle housing, left and right generally longitudinally extending leaf springs connected to said vehicle chassis, separate left and right connecting means connecting said left and right leaf springs to said axle housing, said connecting means each comprising a plurality of tension shackles, each of said tension shackles being pivotally connected at one of its ends to said axle housing and at its other end to said leaf spring, the pivot axes of the tension shackles of the left connecting means being slightly inclined to intersect said right spring in the plan view rearwardly of said right connecting means and the pivot axes of the tension shackles of the right connecting means being inclined to intersect said left spring in the plan view rearwardly of said left connecting means whereby said axle housing will cant relative to said vehicle chassis to produce a steering effect when a lateral force is imposed upon said vehicle chassis.

10. The combination of claim 9 including resilient stop means connected to each of said springs and constructed to limit relative movement between each of said springs and said axle housing.

References Cited by the Examiner

UNITED STATES PATENTS

| | | | |
|---|---|---|---|
| 1,407,916 | 2/1922 | Belden | 267—41 |
| 1,421,758 | 7/1922 | Belden | 267—41 |
| 1,537,983 | 5/1925 | Braselton | 267—41 |
| 2,309,812 | 2/1943 | Utz | 267—52 |
| 3,103,349 | 9/1963 | Palajac | 267—52 |
| 3,111,309 | 11/1963 | Andren | 267—52 |

FOREIGN PATENTS

| | | |
|---|---|---|
| 534,022 | 12/1921 | France. |
| 622,428 | 11/1935 | Germany. |

A. HARRY LEVY, *Primary Examiner.*

LEO FRIAGLIA, *Examiner.*